United States Patent
Miyata

(10) Patent No.: US 9,360,329 B2
(45) Date of Patent: Jun. 7, 2016

(54) NAVIGATION DEVICE AND POSITION REGISTRATION METHOD

(75) Inventor: Hiromasa Miyata, Tokyo (JP)

(73) Assignee: Sony Corporation, Tokyo (JP)

( * ) Notice: Subject to any disclaimer, the term of this patent is extended or adjusted under 35 U.S.C. 154(b) by 1217 days.

(21) Appl. No.: 12/108,798

(22) Filed: Apr. 24, 2008

(65) Prior Publication Data

US 2008/0281511 A1 Nov. 13, 2008

(30) Foreign Application Priority Data

May 10, 2007 (JP) .................. 2007-125962

(51) Int. Cl.
*G01C 21/00* (2006.01)
*G01C 21/32* (2006.01)
*G01C 21/36* (2006.01)

(52) U.S. Cl.
CPC ............ *G01C 21/32* (2013.01); *G01C 21/3682* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,266,615 B1 * | 7/2001 | Jin | ...................... | G01C 21/3484 340/995.23 |
| 6,321,158 B1 * | 11/2001 | DeLorme et al. | ............. | 701/426 |
| 6,834,276 B1 * | 12/2004 | Jensen | ............... | G06F 17/30882 |
| 7,039,630 B2 * | 5/2006 | Shimazu | ............ | H04N 13/0011 348/E13.008 |
| 7,076,505 B2 * | 7/2006 | Campbell | ............ | G01C 21/367 340/990 |
| 7,239,963 B2 * | 7/2007 | Suzuki | .......................... | 701/438 |
| 7,268,664 B2 * | 9/2007 | Tanaka et al. | ................. | 340/5.64 |
| 7,486,958 B2 * | 2/2009 | Sheha | ............... | H04L 29/12066 379/142.1 |
| 7,599,795 B1 * | 10/2009 | Blumberg | .............. | G01C 21/20 701/426 |
| 7,917,507 B2 * | 3/2011 | Kim | .......................... | G06F 8/00 707/736 |
| 7,933,929 B1 * | 4/2011 | McClendon | ........ | G06F 3/04815 707/802 |
| 8,010,279 B2 * | 8/2011 | Kobuya | .................. | G01C 21/36 340/995.1 |
| 8,688,367 B2 * | 4/2014 | Mauderer | .............. | G01C 21/26 340/988 |
| 8,819,117 B2 * | 8/2014 | Moriwaki | ......... | G06F 17/30241 358/1.15 |
| 2002/0026289 A1 * | 2/2002 | Kuzunuki | .............. | G01C 21/34 702/150 |
| 2002/0133289 A1 * | 9/2002 | Miyaki | .................. | G01C 21/36 701/400 |
| 2003/0007464 A1 * | 1/2003 | Balani | ................ | G06Q 30/0601 370/310 |
| 2003/0043019 A1 * | 3/2003 | Tanaka et al. | ................ | 340/5.64 |
| 2003/0078035 A1 * | 4/2003 | Sheha | .............. | H04L 29/12066 455/414.1 |
| 2004/0070602 A1 * | 4/2004 | Kobuya | .................. | G01C 21/36 715/738 |
| 2004/0088110 A1 * | 5/2004 | Suzuki | .......................... | 701/211 |
| 2004/0172191 A1 * | 9/2004 | Vitikainen | ............. | G01C 21/32 701/426 |
| 2005/0073443 A1 * | 4/2005 | Sheha | .................... | G01C 21/36 340/995.1 |
| 2005/0154720 A1 * | 7/2005 | Kurosawa | ......... | G06F 17/30241 |
| 2005/0203698 A1 * | 9/2005 | Lee | ................. | 701/200 |
| 2006/0080030 A1 * | 4/2006 | Okude | .................. | G01C 21/32 701/452 |
| 2006/0080596 A1 * | 4/2006 | Bhogal et al. | ................. | 715/503 |

(Continued)

FOREIGN PATENT DOCUMENTS

| | | |
|---|---|---|
| JP | 2000-337911 | 12/2000 |
| JP | 2001-133282 | 5/2001 |

(Continued)

*Primary Examiner* — Jonathan L Sample
(74) *Attorney, Agent, or Firm* — Oblon, McClelland, Maier & Neustadt, L.L.P.

(57) ABSTRACT

The present invention provides a navigation device which includes an obtaining unit that, when updating contents introduction data which introduces the latest updating contents of an arbitrary home page is sent from the outside, obtains the updating contents introduction data, a position information generation unit that generates position information according to the latitude and longitude information included in the updating contents introduction data, and a position registration unit that registers the position information in a predetermined storage unit.

21 Claims, 8 Drawing Sheets

(56) References Cited

U.S. PATENT DOCUMENTS

| | | | |
|---|---|---|---|
| 2006/0106953 A1* | 5/2006 | Kelly et al. | 710/13 |
| 2006/0123053 A1* | 6/2006 | Scannell, Jr. | G06F 17/30035 |
| 2006/0161344 A1* | 7/2006 | Iwahori et al. | 701/211 |
| 2006/0271281 A1* | 11/2006 | Ahn | G09B 29/106 701/532 |
| 2007/0032949 A1* | 2/2007 | Arai | G01C 21/00 701/420 |
| 2007/0050128 A1* | 3/2007 | Lee et al. | 701/200 |
| 2007/0110316 A1* | 5/2007 | Ohashi | G06F 17/30265 382/195 |
| 2007/0140439 A1* | 6/2007 | Olrik | H04L 12/5895 379/67.1 |
| 2007/0150444 A1* | 6/2007 | Chesnais | H04W 4/02 |
| 2007/0233367 A1* | 10/2007 | Chen | G01C 21/00 701/408 |
| 2007/0240039 A1* | 10/2007 | Hosotsubo | G06F 17/211 715/210 |
| 2007/0262860 A1* | 11/2007 | Salinas | G06Q 30/02 340/539.12 |
| 2008/0027635 A1* | 1/2008 | Tengler | G01C 21/36 701/533 |
| 2008/0046175 A1* | 2/2008 | Tengler | G01C 21/3647 701/414 |
| 2008/0052372 A1* | 2/2008 | Weber | G06F 17/30265 709/217 |
| 2008/0112551 A1* | 5/2008 | Forbes | H04M 3/42042 379/142.1 |
| 2008/0158018 A1* | 7/2008 | Lau | G01C 21/20 340/995.24 |
| 2008/0195978 A1* | 8/2008 | Wissenbach | G01C 21/362 715/854 |
| 2008/0243786 A1* | 10/2008 | Stading | G06F 17/30011 |
| 2008/0243787 A1* | 10/2008 | Stading | G06F 17/30864 |
| 2008/0281511 A1* | 11/2008 | Miyata | G01C 21/32 701/408 |
| 2009/0100185 A1* | 4/2009 | Sheha et al. | 709/229 |
| 2009/0171976 A1* | 7/2009 | Obara et al. | 707/10 |
| 2009/0177381 A1* | 7/2009 | Taniguchi | G06F 17/3087 701/454 |
| 2009/0303676 A1* | 12/2009 | Behar | G06F 1/162 361/679.27 |
| 2009/0322790 A1* | 12/2009 | Behar | G06F 1/162 345/659 |
| 2010/0211311 A1* | 8/2010 | Fu | 701/208 |

FOREIGN PATENT DOCUMENTS

| | | |
|---|---|---|
| JP | 2001-183154 | 7/2001 |
| JP | 2006-155558 | 6/2006 |
| JP | 2007-11161 | 1/2007 |

\* cited by examiner

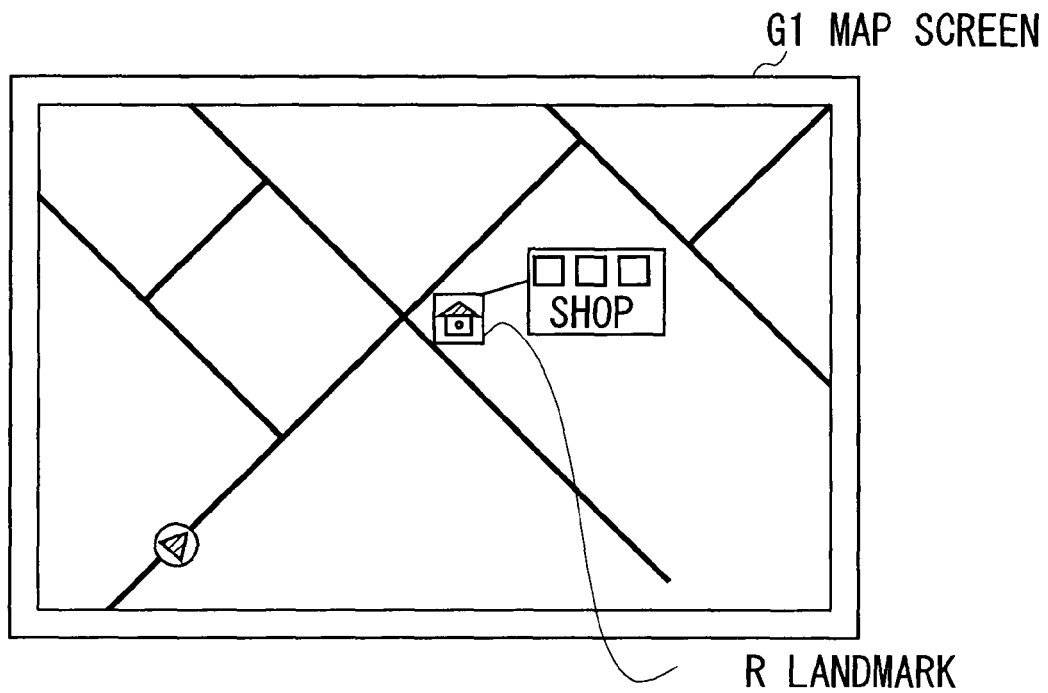
FIG. 2 (REALATED ART)
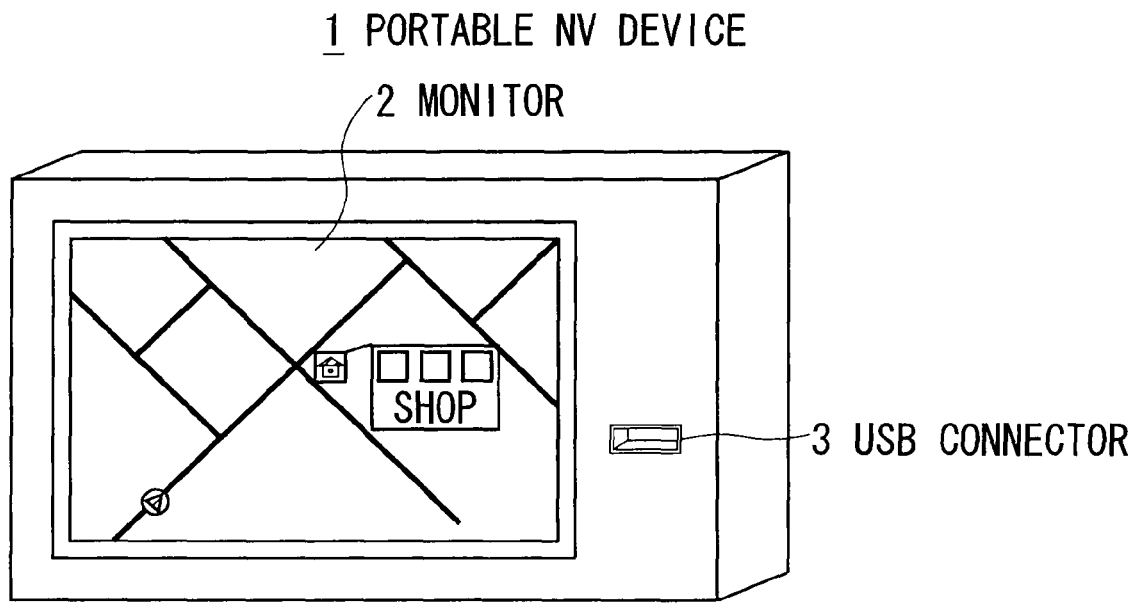
FIG.3

101 RSS
```
<channel>
<title>TSUREZURE(IDLENESS)-DIARY OF JOURNEY
</channel>
  :
  :
<title>NEWLY OPENED ○□× RESTAURANT</title>
<description>
    I WENT TO A NEWLY OPENED ○□× RESTAURANT・・・
</description>
<geo:lat>12.345</geo:lat>      ⎫
<geo:long>123.45</geo:long>    ⎬ geo 200
<link>http://AAA.com/A.rss</link>
  :
  :
```

NAVIGATION DEVICE AND POSITION REGISTRATION METHOD

CROSS REFERENCES TO RELATED APPLICATIONS

The present invention contains subject matter related to Japanese Patent Application JP2007-125962 filed in the Japanese Patent Office on May 10, 2007, the entire contents of which being incorporated herein by reference.

BACKGROUND OF THE INVENTION

1. Field of the Invention

This invention relates to a navigation device and a position registration method, which are desirably applied to a portable navigation device referred to as, for example, Personal Navigation Device (PND) (referred to as portable NV device, hereinafter).

2. Description of the Related Art

In a portable NV device, for example, a Point of Interest (POI) as position information prepared in advance by the maker side such as a restaurant and a resort facility is made to correspond to map data, and is registered in an embedded memory.

In the portable NV device, as shown in FIGS. 1A to 1D, on a menu screen M displayed on a monitor of the portable NV device, on the lowest hierarchy of the hierarchical structure of a selection icon S1 divided for selecting an item such as a genre, a position information icon S2 corresponding to the POI is displayed. When the selection icon S1 is selected by the user in turn, the position information icon S2 on the lowest hierarchy of the hierarchical structure can be selected, for example, in the order of "restaurant" (FIG. 1A), "Italian food" (FIG. 1B), "XXXX group" (FIG. 1C), and "□□□ shop" (FIG. 1D).

Then, when the position information icon S2 is selected by the user, as shown in FIG. 2, the portable NV device arranges a landmark R corresponding to the position information icon S2 (POI) on a map screen G1 displayed on the monitor.

On the other hand, the position information icon S2 (POI) is often updated according to the updating time of map data which is performed about once a year. That is, since the position information icon S2 (POI) is not updated frequently, the information is apt to be old as days pass from the updating time. Thus, there is a problem that it is difficult for the portable NV device to provide the POI according to the season of year for the user.

To solve the problem, there is a manufacturer which is the producer of the portable NV device that delivers the latest POI to the portable NV device through the Internet (for example, refer to Jpn. Pat. Appln. Laid-Open Publication No. 2003-247837).

SUMMARY OF THE INVENTION

Meanwhile, irrespective of the frequency of the updating, since the conventional portable NV device unilaterally receives the POI delivered from the manufacturer side to perform the updating, there is a problem that the conventional portable NV device is unable to respond to a demand of the user that a new POI is desired to be registered based on information found at a home page on the Internet etc.

On the other hand, there is considered a case in which the POI is manually generated and registered with respect to the portable NV device based on information obtained by the user from a home page on the Internet etc. On the other hand, since only a touch panel or a few buttons are arranged on the portable NV device, when registering the POI based on information obtained from a home page, the user is forced to perform troublesome operations such as inputting an address etc., and there is a problem that position information (POI) is unable to be registered easily.

In view of the above-identified circumstances, it is therefore desirable to provide a navigation device and a position registration method which can easily register position information which the user desires.

According to an embodiment of the present invention, there is provided a navigation device that, when updating contents introduction data which introduces the latest updating contents of an arbitrary home page is sent from the outside, obtains the updating contents introduction data, generates position information according to the latitude and longitude information included in the updating contents introduction data, and registers the position information in predetermined storage means. Accordingly, without forcing the user to perform troublesome operations such as inputting an address etc., when the user performs an operation to make the navigation device obtain the updating contents introduction data indicative of a desired position, position information desired by the user can be registered.

Accordingly, it becomes possible to realize a navigation device and a position registration method which can easily register position information desired by the user.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2 shows a schematic view indicative of the state of displaying a map screen in the conventional portable NV device;

FIG. 3 shows a schematic view indicative of the exterior configuration of a portable NV device in this embodiment;

DETAILED DESCRIPTION OF THE PREFERRED EMBODIMENTS

Now, an embodiment of the present invention will be described in greater detail by referring to the accompanying drawings.

(1) Exterior Configuration of Portable NV Device

Figure 1:
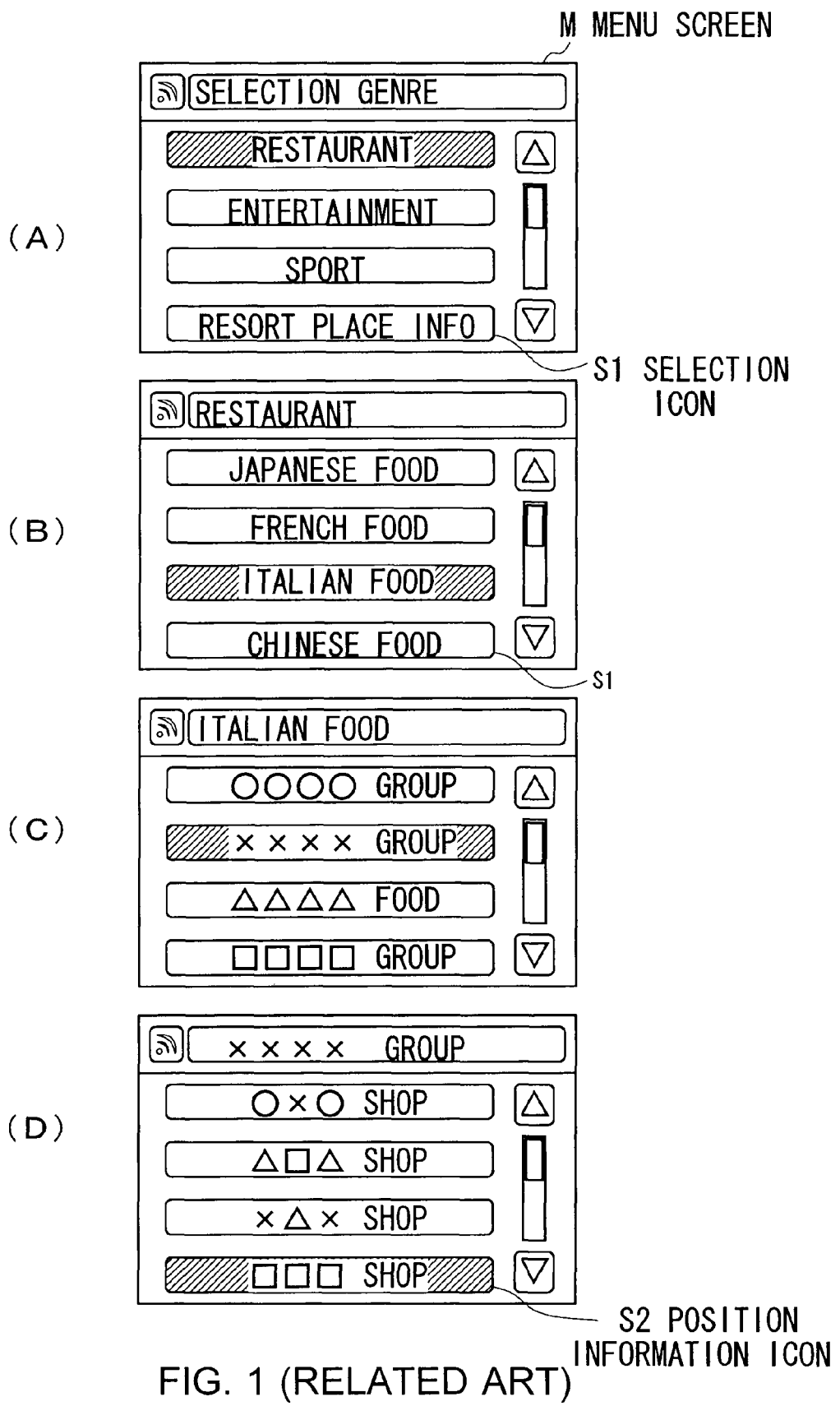
FIGS. 1A to 1D show schematic views indicative of the state of selecting POI in a conventional portable NV device.
Figure 4:
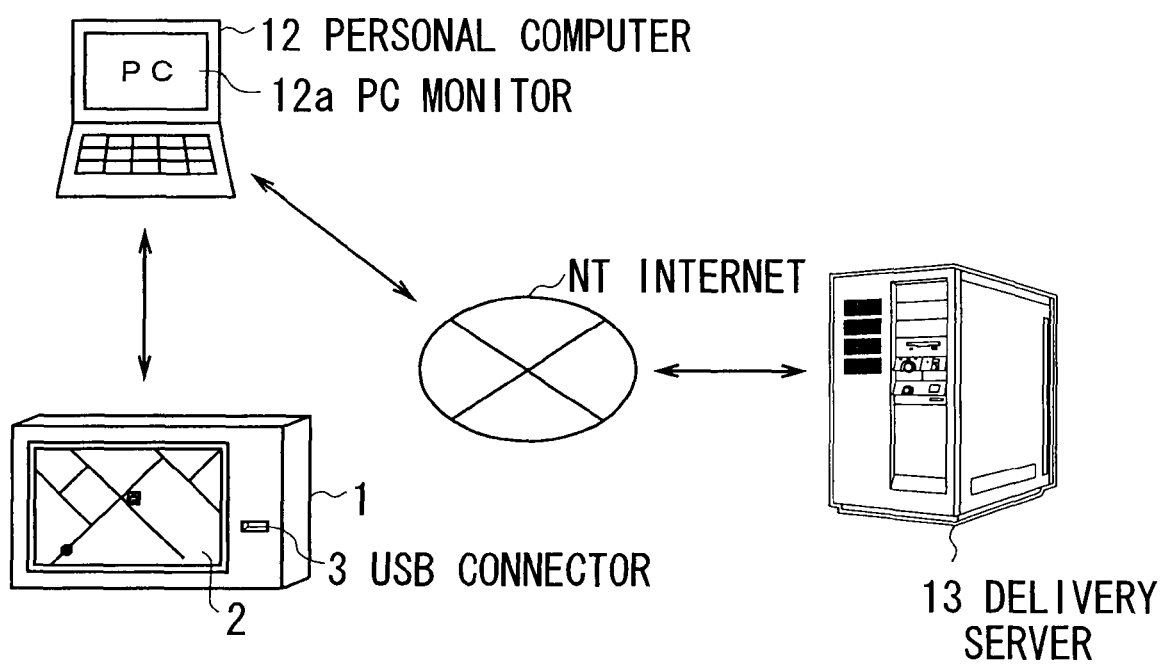
FIG. 4 shows a schematic view indicative of the state of transferring information to the portable NV device.

Referring to FIG. 3 and FIG. 4, a reference numeral "1" represents a portable NV device which can be carried about and is used mainly in a vehicle, and a monitor 2 is arranged on the front surface thereof. A map screen etc. based on map data stored in an embedded memory is displayed on the monitor 2.

In the portable NV device 1, a Universal Serial Bus (USB) connector 3 is arranged on the right side of the monitor 2, and a personal computer 12 is connected to the USB connector 3 through a USB cable (not shown).

In the personal computer 12, various information obtained from a delivery server 13 or an arbitrary home page through the Internet NT is stored in an embedded memory.

In the delivery server 13, a database (referred to as position retrieval database, hereinafter) to retrieve the POI corresponding to the name of landmark (referred to as landmark name, hereinafter) is previously stored in the embedded memory.

(2) Information Delivery to Portable NV Device

Figure 5:
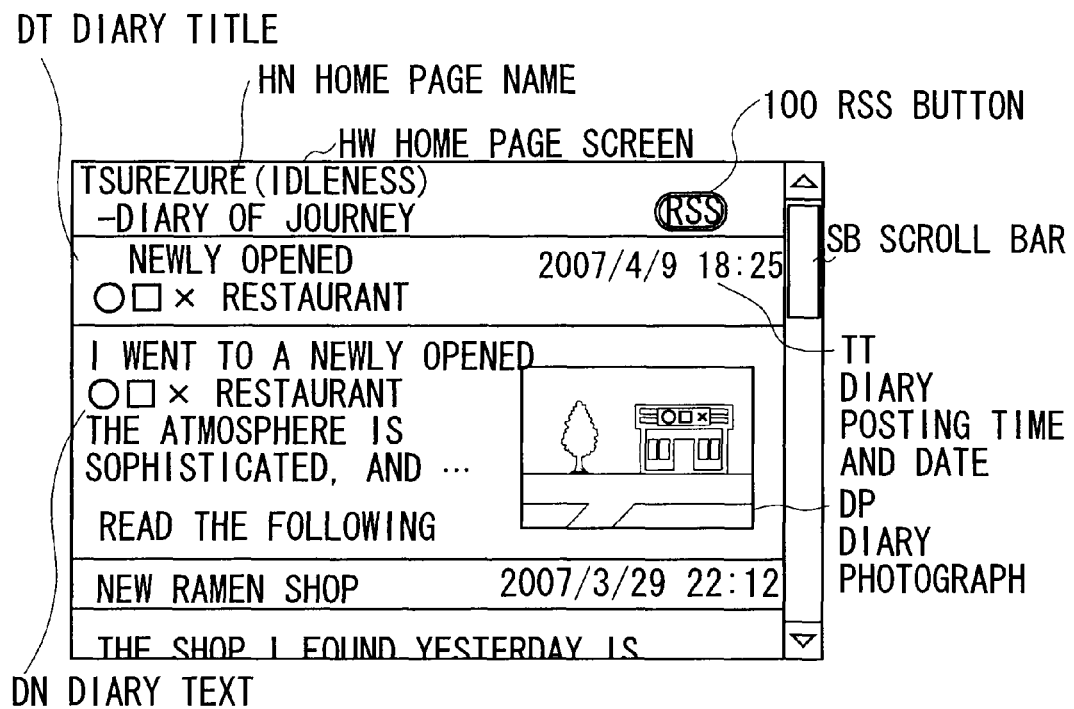
FIG. 5 shows a schematic view indicative of the configuration of a home page screen.

When the personal computer 12 is connected to the portable NV device 1, and is connected on an arbitrary home page (for example, blog in which record of journey is represented in the form of diary) on the Internet NT according to the operation from the user, the personal computer 12 obtains home page screen data to display a home page screen from the access point. Then, as shown in FIG. 5, the personal computer 12 displays a home page screen HW based on the home page screen data on a PC monitor 12a (FIG. 4).

That is, based on the home page screen data, the personal computer 12 displays a home page name HN such as "Tsurezure (idleness)—diary of journey" on the upper part of the home page screen HW, displays a diary title DT such as "newly opened ○□x restaurant" and a diary posting time and date TT such as "2007/4/9 18:25" thereunder, and further displays a diary text DN which represents the contents of the diary using text and a diary photograph DP related to the diary thereunder.

When a scroll bar SB arranged on the right side of the home page screen HW is shifted from top to bottom, the personal computer 12 displays the diary posted up to now from new one to old one in turn.

Furthermore, on the right side of the home page name HN on the home page screen HW, the personal computer 12 displays an RSS button 100 to obtain the headline every time the home page screen HW is updated (that is, diary title DT of newly posted diary) or the summary of the diary text DN as the Rich Site Summary (RSS) which is metadata written in the Extensible Markup Language (XML) format from the access point.

Then, as a result of displaying the home page screen HW (FIG. 5) on the PC monitor 12a (FIG. 4), when recognizing that the RSS button 100 is selected through a keyboard or a mouse (not shown) by a user who desires to obtain information written on the home page screen HW, the personal computer 12 obtains the RSS from the access point (that is, request and receive the RSS).

Figures 6, 7:
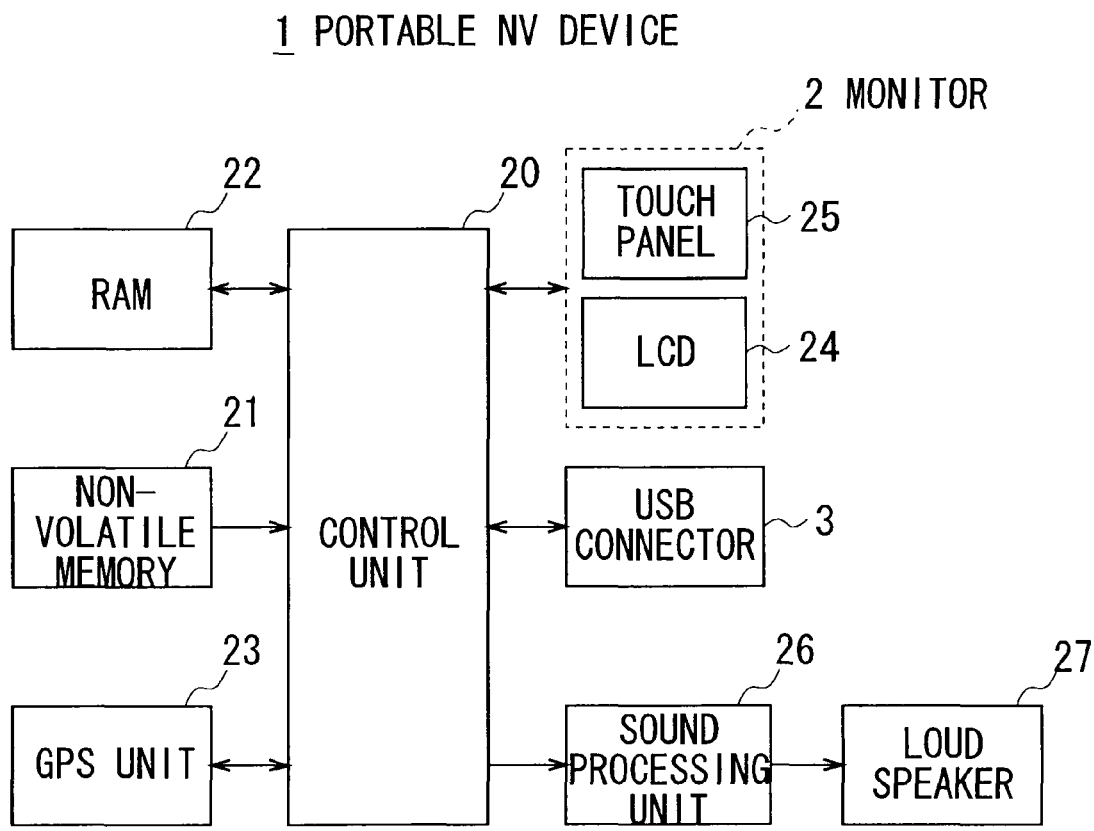
FIG. 6 shows a schematic view indicative of the configuration of RSS.
FIG. 7 shows a schematic view indicative of the circuit configuration of the portable NV device in this embodiment.

As shown in FIG. 6, on a RSS 101, for example, the headline of the latest diary title DT every time the home page screen HW is updated, summary of the diary text DN, link point of image data of the diary photograph DP, and a Geostationary Earth Orbit (geo) 200 indicative of the latitude and longitude information are written in the XML format, and the latest information can be represented all the time.

A geo 200 is written, for example, based on the latitude and longitude information added to a photograph etc. of a sight-seeing spot released on a home page, or latitude and longitude information obtained by a service such as the Google Map (registered trademark of Google, Inc.)

When obtaining the RSS 101, the personal computer 12 transfers the RSS 101 to the portable NV device 1.

In this way, to the portable NV device 1, the RSS 101 obtained by the personal computer 12 can be transferred.

(3) Circuit Configuration of Portable NV Device

As shown in FIG. 7, in the portable NV device 1, a control unit 20 configured by a Central Processing Unit (CPU) controls the entire units, and reads out a basic program and an application program stored in a nonvolatile memory 21 to execute the basic program and application program on a Random Access Memory (RAM) 22. Thus, general navigation function and position registration function etc. to be described later will be realized.

In the nonvolatile memory 21 of the portable NV device 1, map data of all parts of the country is stored. Furthermore, in the nonvolatile memory 21, the POI which is formed by a unique format of a manufacturer is made to correspond to the position on the map represented by the map data, and is previously registered.

A Global Positioning System (GPS) unit 23 of the portable NV device 1 is so configured as to calculate the GPS information configured by the latitude, longitude, altitude etc. all the time by receiving an electric wave from a GPS satellite, and sends thus obtained GPS information to the control unit 20.

By comparing the GPS information sent from the GPS unit 23 and the map data stored in the nonvolatile memory 21, the control unit 20 reads out map data representing a map of a predetermined range including the current position of the portable NV device 1 (that is, vehicle position where a vehicle to which the portable NV device 1 is loaded exists) from the nonvolatile memory 21, and displays a map image based on the map data on a Liquid Crystal Display (LCD) 24 of the monitor 2.

Then, according to the user operation corresponding to a touch panel 25 arranged on the surface of the LCD 24 of the monitor 2, when the POI is arbitrarily selected as the destination (hereinafter, thus selected POI is referred to as destination POI), the control unit 20 calculates the route of access, arrival predicted time, etc. to the destination corresponding to the destination POI from the vehicle position, and the route of access, arrival predicted time, etc. are arranged on the map image displayed on the LCD 24.

At this time, by controlling a sound processing unit 26, while the vehicle driven by the user is traveling to the destination along the route of access, the control unit 20 generates sound information to guide and aid the driving of the vehicle (referred to as navigate collectively, hereinafter), and outputs a navigate sound based on the sound information from a loudspeaker 27.

In this way, the portable NV device 1 is so configured as to provide the navigation function to navigate the vehicle to a destination desired by the user.

(4) Position Registration Function

Next, position registration function of registering new POI (referred to as novel POI, hereinafter) such as a newly opened restaurant, a secluded hot spring spot, a sightly location best suited for bloom gazing by utilizing the fact that the personal computer 12 supplies the RSS 101 to the portable NV device 1 will be described.

Firstly, as described above, when connected to the personal computer 12, the control unit 20 of the portable NV device 1 receives the RSS 101 transmitted from the personal computer 12, and stores thus received RSS 101 in the nonvolatile memory 21.

The control unit 20 reads out the RSS 101 (FIG. 6) from the nonvolatile memory 21, and, in case of detecting the geo tag such as <geo:lat> or <geo:long> in the character strings of the XML format of the RSS 101, the control unit 20 recognizes and extracts part sandwiched by <geo:lat> and </geo:lat>, and part sandwiched by <geo:long> and </geo:long> as the geo 200 (that is, retrieves geo 200 and extracts the geo 200 when detected).

Furthermore, in addition to extracting the geo 200, from part of the above-described home page screen HW (FIG. 5) in the RSS 101 where the summary of the diary text DN is written (specifically, text part sandwiched by the character strings <description> and </description> of the XML format), landmark names such as " . . . hotel", " . . . restaurant", " . . . store", " . . . hospital", " . . . shore", " . . . park", " . . . valley", " . . . amusement park", and " . . . theater" are extracted.

In this way, the control unit 20 extracts and obtains the geo 200 and landmark name (In this case, as an example, "○□x restaurant" is set) from the RSS 101 (FIG. 6).

Then, based on thus obtained geo 200 and landmark name, the control unit 20 generates the novel POI as the POI to be newly registered, and makes the nonvolatile memory 21 store the novel POI to register the novel POI.

On the other hand, in the case where the geo 200 is not written in the RSS 101, the control unit 20 extracts and reads out only the landmark name written in the RSS 101. The control unit 20 transmits a position retrieval request signal to request retrieving the POI corresponding to the landmark name to the delivery server 13 through the personal computer 12 and Internet NT.

As a result of transmitting the position retrieval request signal to the delivery server 13, in the case where the POI corresponding to the landmark name is returned from the delivery server 13, the control unit 20 makes the nonvolatile memory 21 store the POI corresponding to the landmark name as the novel POI to register the novel POI.

In this way, in the state in which the portable NV device 1 is connected to the personal computer 12, according to the user operation, when the RSS 101 desired by the user is only transferred from the personal computer 12, the portable NV device 1 can register the novel POI corresponding to the RSS 101.

Figure 8:
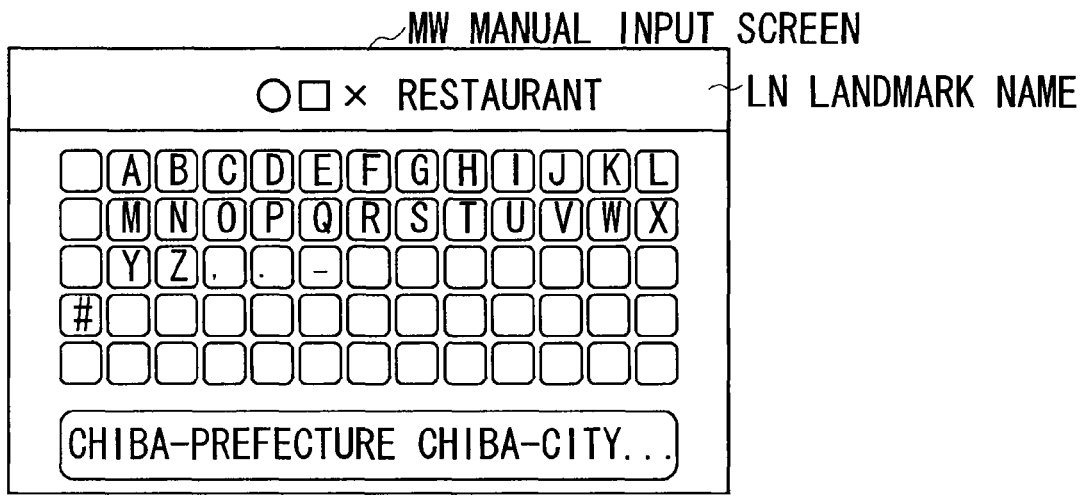
FIG. 8 shows a schematic view indicative of the configuration of a manual input screen.

On the other hand, as a result of transmitting the position retrieval request signal to the delivery server 13, in the case where the POI corresponding to the landmark name is not returned from the delivery server 13, as shown in FIG. 8, the control unit 20 generates a manual input screen MW and displays the manual input screen MW on the LCD 24. Accordingly, the control unit 20 notifies the user that the POI corresponding to the landmark name LN does not exist in the position retrieval database of the delivery server 13, and accepts that the POI (In this case, for example, address) corresponding to the landmark name is manually input by the user.

Then, when the POI is manually input by the user input operation with respect to the touch panel 25, the control unit 20 makes the nonvolatile memory 21 store the POI as the novel POI to register the novel POI.

In this way, in the case where the novel POI corresponding to the RSS 101 desired by the user is unable to be automatically registered, the portable NV device 1 can prompt the user to input the novel POI manually, which can assure the opportunity to input the novel POI.

Figure 9:
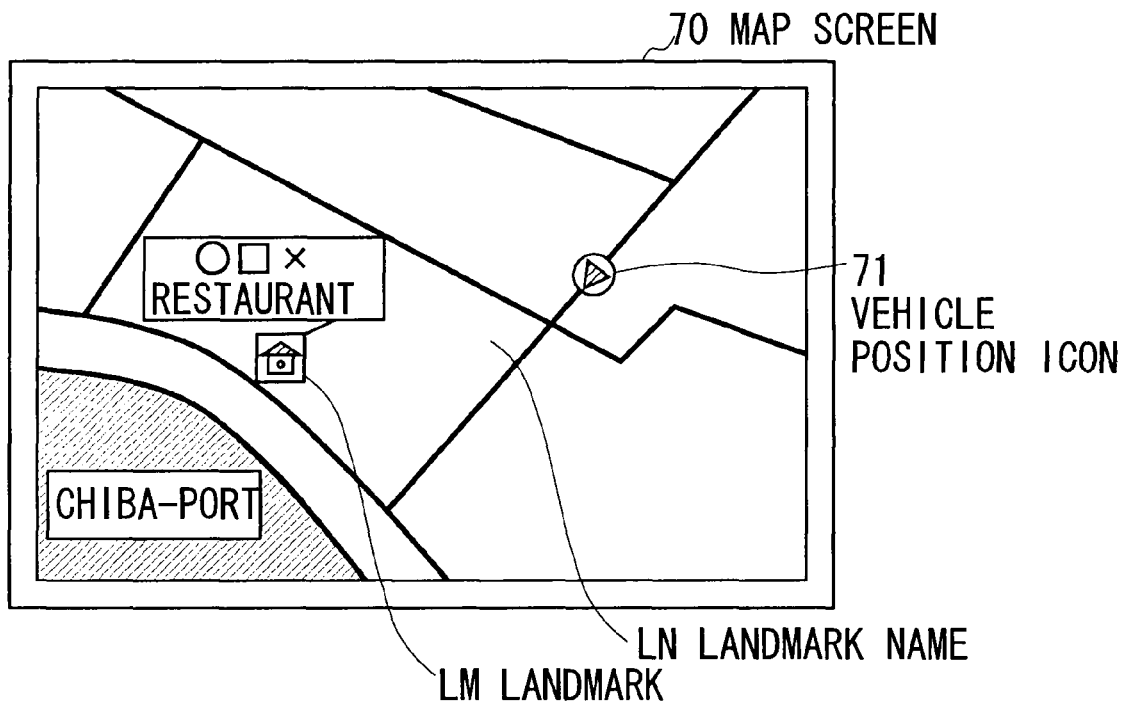
FIG. 9 shows a schematic view indicative of the state of displaying a landmark.

Then, as shown in FIG. 9, the control unit 20 reads out map data of a predetermined range including a position represented by the newly registered novel POI from the nonvolatile memory 21, and generates a map screen 70 based on the map data to display the map screen 70 on the LCD 24.

Then, according to the GPS information sent from the GPS unit 23, the control unit 20 arranges a vehicle position icon 71 corresponding to a vehicle position on the map screen 70, and arranges a landmark LM and a landmark name LN (In this case, as an example, "○□x restaurant" is set) corresponding to the novel POI on the map screen 70.

In this way, in the state in which the portable NV device 1 is connected to the personal computer 12, according to the user operation, when the RSS 101 desired by the user is only transferred from the personal computer 12, the portable NV device 1 can arrange the landmark LM and landmark name LN of the destination desired by the user on the map screen 70, and display them on the LCD 24.

(5) Position Registration Processing Procedure

Figure 10:
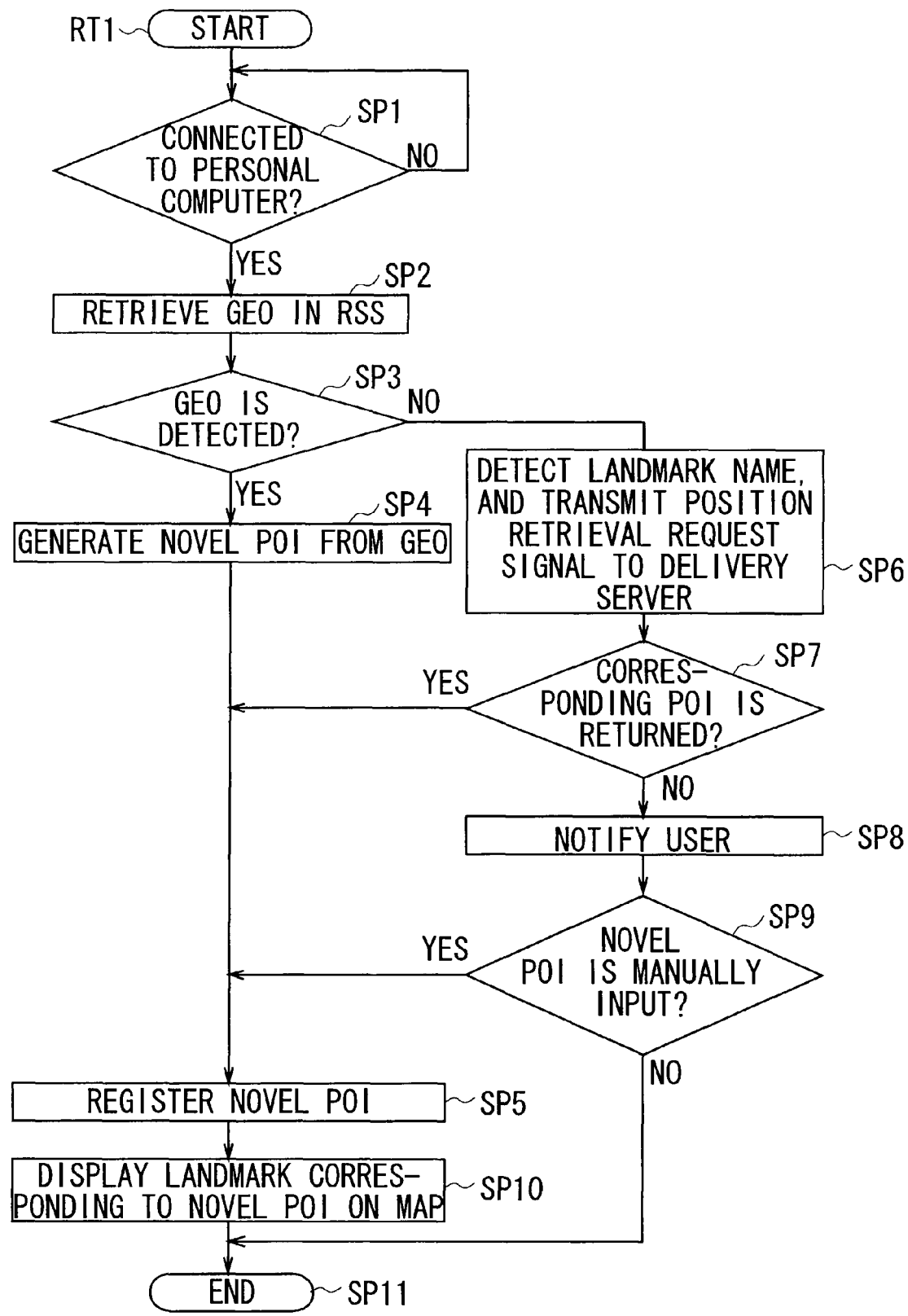
FIG. 10 shows a flowchart indicative of the position registration processing procedure.

Next, the position registration processing procedure under which the control unit 20 of the portable NV device 1 obtains the RSS 101 and registers the novel POI using the position registration function based on the above-described application program will be explained using a flowchart shown in FIG. 10.

Actually, the control unit 20 of the portable NV device 1 starts the routine RT1 from the start step, and the processing goes to step SP1, and determines whether or not the portable NV device 1 is connected to the personal computer 12. In step SP1, in the case where a positive result is obtained, this indicates that a USB cable (not shown) is connected to the USB connector 3, and the portable NV device 1 is connected to the personal computer 12, and then the control unit 20 goes to next step SP2.

On the other hand, in step SP1, in the case where a negative result is obtained, this indicates that the portable NV device 1 is not connected to the personal computer 12, and the control unit 20 waits for the personal computer 12 to be connected thereto.

In step SP2, the control unit 20 reads out the RSS 101 (FIG. 6) transmitted from the personal computer 12 to store thus read out RSS 101 in the nonvolatile memory 21, and retrieves the geo 200 in the RSS 101, and goes to the next step SP3.

In step SP3, the control unit 20 determines whether or not it is detected that the geo 200 is written in the RSS 101. In step SP3, in the case where a positive result is obtained, this indicates that the novel POI can be generated based on the geo 200 of the RSS 101, and the control unit 20 goes to the next step SP4.

In step SP4, the control unit 20 extracts the geo 200 and landmark name from the RSS 101 (FIG. 6), and generates the novel POI as POI to be newly registered from the geo 200 and landmark name, and goes to the next step SP5.

On the other hand, in step SP3, in the case where a negative result is obtained, this indicates that the geo 200 is unable to be extracted from the RSS 101, and then the control unit 20 goes to step SP6.

In step SP6, the control unit 20 extracts the landmark name LN from the RSS 101, and transmits the position retrieval request signal to request retrieving the POI corresponding to the landmark name to the delivery server 13, and the processing goes to step SP7.

As a result of transmitting the position retrieval request signal to the delivery server 13, in step SP7, the control unit 20 determines whether or not the POI corresponding to the landmark name LN is returned from the delivery server 13. In step SP7, when a positive result is obtained, this indicates that the novel POI can be obtained, and the control unit 20 goes to step SP5.

On the other hand, in step SP7, when a negative result is obtained, this indicates that the POI corresponding to the landmark name is not stored in the position retrieval database of the delivery server 13, and the novel POI is unable to be obtained, and then the control unit 20 goes to step SP8.

In step SP8, the control unit 20 generates a manual input screen MW (FIG. 8) corresponding to the landmark name LN, and displays the manual input screen MW on the LCD 24. Accordingly, the control unit 20 notifies the user that the POI corresponding to the landmark name LN is unable to be obtained, and waits for the novel POI corresponding to the landmark name LN to be manually input by the user, and the processing goes to the next step SP9.

In step SP9, the control unit 20 determines whether or not the novel POI is manually input by the user. In step SP9, in the case where a positive result is obtained, this indicates that the novel POI is input, and the control unit 20 goes to step SP5.

On the other hand, in step SP9, in the case where a negative result is obtained, this indicates that the novel POI is unable to be obtained finally, and then the control unit 20 goes to step SP11, and ends the processing.

In step SP5, the control unit 20 registers the novel POI by storing the novel POI in the nonvolatile memory 21, and the processing goes to step SP10.

In step SP10, the control unit 20 displays the landmark LM and landmark name LN corresponding to the newly registered novel POI on the map screen 70 (FIG. 9), and the processing goes to next step SP11 to end the processing.

In this way, in the state in which the portable NV device 1 is connected to the personal computer 12, according to the user operation, when the RSS 101 desired by the user is transferred from the personal computer 12, the control unit 20 can automatically register the novel POI corresponding to the RSS 101, and display the landmark LM and landmark name LN corresponding to the novel POI.

(6) Operation and Effect

In the above-described configuration, in the state in which the portable NV device 1 is connected to the personal computer 12, when the RSS 101 desired by the user is transferred from the personal computer 12, in the case where the geo 200 is written in the RSS 101, the control unit 20 generates the novel POI according to the geo 200, and registers the novel POI in the nonvolatile memory 21.

Furthermore, in the case where the geo 200 is not written in the RSS 101, the control unit 20 obtains the POI corresponding to the landmark name written in the RSS 101 from the position retrieval database of the delivery server 13, and registers the POI in the nonvolatile memory 21 as the novel POI.

In this way, according to the user operation, when the RSS 101 desired by the user is only transferred from the personal computer 12, the control unit 20 of the portable NV device 1 can register the novel POI which is the destination desired by the user. As a result, the control unit 20 can display the landmark LM and landmark name LN corresponding to the novel POI on the map screen 70, and make the user visually confirm the landmark LM and landmark name LN.

According to the configuration, by making the user perform the operation of connecting the personal computer 12 to the portable NV device 1, and supplying the RSS 101 to the portable NV device 1, the control unit 20 can register the novel POI without forcing the user to perform troublesome operations such as inputting an address etc. Accordingly, the novel POI desired by the user can be easily registered.

(7) Other Embodiments

Figure 11:
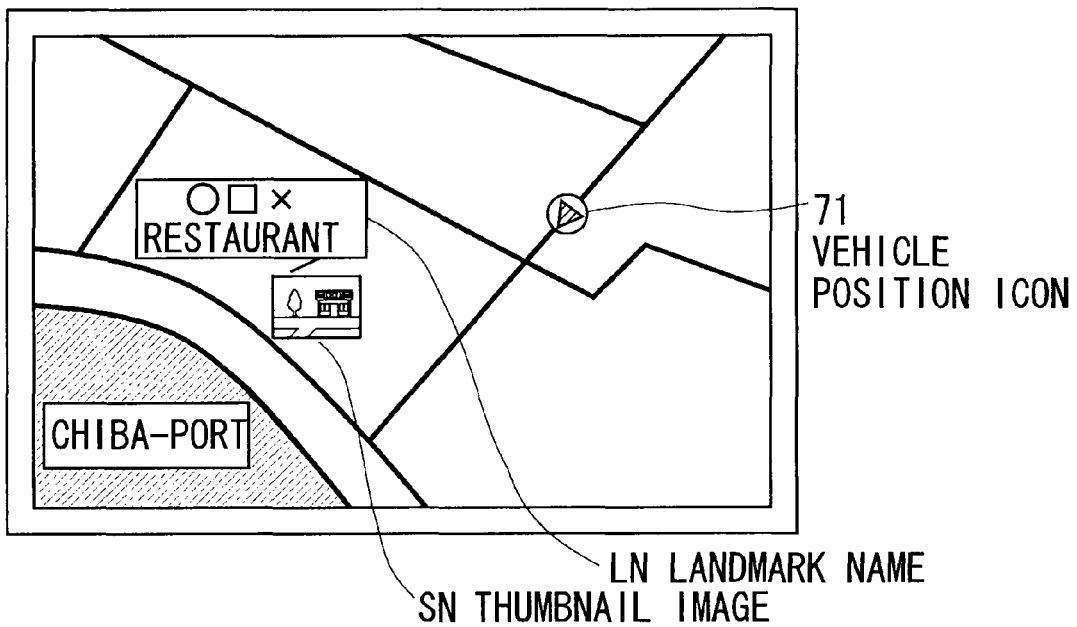
FIG. 11 shows a schematic view indicative of the state of displaying a thumbnail image.

In the above-described embodiment, the portable NV device 1 displays the landmark LM and landmark name LN corresponding to the newly registered novel POI on the map screen 70 (FIG. 9), to which the present invention is not restricted. When the RSS 101 (FIG. 6) is obtained from the personal computer 12, by also obtaining a thumbnail image of a diary photograph DP on the home page screen HW (FIG. 5) based on the RSS 101 from the link point corresponding to the Uniform Resource Locator (URL) written in the RSS 101 as the link point information, as shown in FIG. 11, a thumbnail image SN may be displayed on the map screen 70 instead of the landmark LM. In this way, the portable NV device 1 can highlight the thumbnail image SN by differentiating it from other landmarks LM, which can easily make the user visually confirm the thumbnail image SN.

Figure 12:
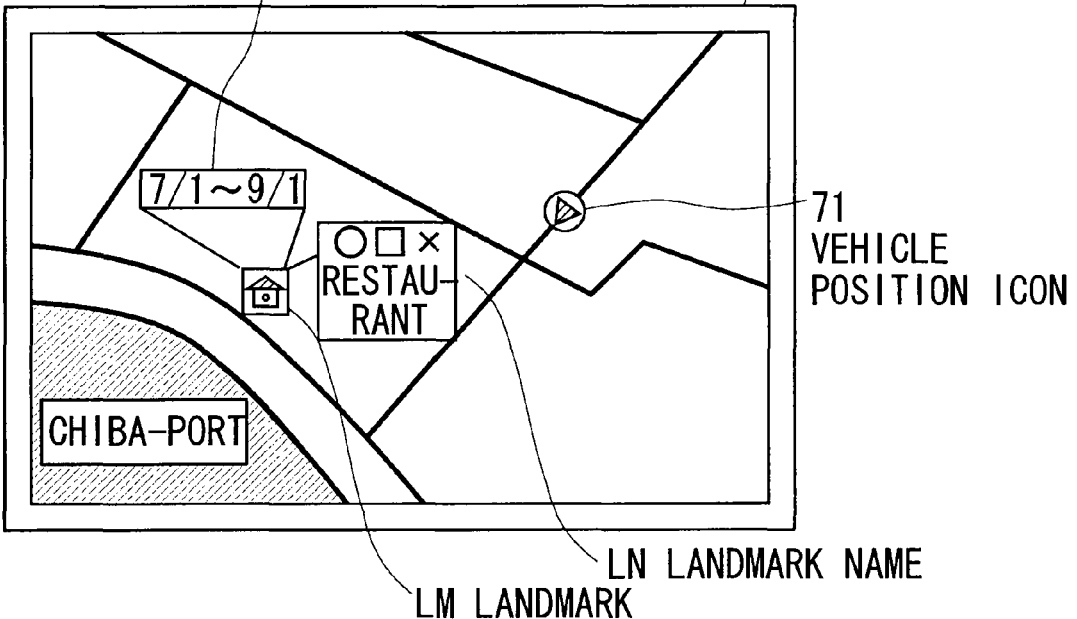
FIG. 12 shows a schematic view indicative of displaying a time period pop-up.

Furthermore, in the case where the event time period such as opening hours of a facility or a festival period are included in the RSS 101 (FIG. 6), the portable NV device 1 may display a time period pop-up indicative of the event time period. Specifically, in the case where it is written that the opening hours of the o□x restaurant are only during summer season from "July 1 to September 1" in the RSS 101, as shown in FIG. 12, in addition to the landmark LM and landmark name LN corresponding to the newly registered novel POI, the portable NV device 1 may display a time period pop-up KP on the map screen 70. In this way, the portable NV device 1 can prevent a situation in which, while the user sets a destination and gets to the destination, the arrival time is out of the opening hours, and thus the facility is not open, which can significantly improve the usability.

Furthermore, in this case, the portable NV device 1 may display the landmark LM, landmark name LN, and time period pop-up KP during only the event time period represented by the time period pop-up KP. In this way, the portable NV device 1 can prevent displaying meaningless POI from making the user have a false idea.

Furthermore, in this case, as a method to obtain the event time period by the portable NV device 1, of the RSS 101, the event time period included in the text part indicative of the title or general outline of the home page screen may be extracted, or, of the RSS 101, the event time period may be obtained from the contents written in a dedicated tag indicative of the event time period. The manner of filling the event time period into the RSS 101 and the manner of extracting the event time period are not restricted.

Furthermore, in the above-described embodiment, the portable NV device 1 obtains the RSS from the personal computer 12 to register the novel POI, to which the present invention is not restricted. Information of other formats such as the Atom or Keyhole Markup Language (KML) may be obtained.

Furthermore, in this case, the portable NV device 1 may extract the landmark name from the RSS related information.

Furthermore, in the above-described embodiment, the nonvolatile memory 21 is employed to store the map data, POI, novel POI, to which the present invention is not restricted. A hard disc drive or an optical disc may be employed. Furthermore, the control unit 20 may store the map data, POI, novel POI in separate storage units respectively.

Furthermore, in the above-described embodiment, the portable NV device 1 is connected to the personal computer 12 through a USB cable, to which the present invention is not restricted. The portable NV device 1 and the personal computer 12 may be connected through the wireless Local Area Network (LAN), wired LAN, or Bluetooth (registered trademark of The Bluetooth SIG Inc.).

Furthermore, in case of using the wireless LAN or Bluetooth, the portable NV device 1 may be directly connected to an access point such as a sightseeing area, amusement facility, parking area. For example, when a service to deliver information which is desired to be provided for respective access points as the RSS is expanded, the portable NV device 1 can obtain information which is recommended in the local area at a trip destination as the RSS 101, and can register the novel POI corresponding to the RSS 101, which can improve the usability.

Furthermore, in the above-described embodiment, the portable NV device 1 detects whether or not the geo 200 is written in the RSS 101, and, in the case where it is detected that the geo 200 is not written, the portable NV device 1 requests the delivery server 13 to retrieve the POI corresponding to the landmark name written in the RSS 101, to which the present invention is not restricted. In the case where a telephone number is written in the RSS 101, the delivery server 13 may be requested to retrieve the POI corresponding to the telephone number. In the case where an address is written in the RSS 101, the portable NV device 1 may calculate the latitude and longitude from the address to generate the novel POI.

Furthermore, in the above-described embodiment, the portable NV device 1 registers the novel POI by obtaining the RSS 101, to which the present invention is not restricted. The novel POI may be automatically set so that the novel POI can be retrieved with an existing POI which has been stored in the nonvolatile memory 21 previously. In this way, the portable NV device 1 can present the novel POI, which has been registered once, to the user similarly to the existing POI, which can improve the usability.

Furthermore, in the above-described embodiment, in the case where the geo 200 is unable to be extracted from the RSS 101, the portable NV device 1 requests the delivery server 13 to retrieve the POI corresponding to the landmark name, to which the present invention is not restricted. There may be employed a configuration in which a position retrieval database has been downloaded to the personal computer 12 previously, and the personal computer 12 is requested to retrieve the POI corresponding to the landmark name.

Furthermore, in the above-described embodiment, the portable NV device 1 extracts the landmark name from part sandwiched by the character strings <description> and </description> of the XML format written in the RSS 101, to which the present invention is not restricted. Part sandwiched by the character strings <title> and </title> of the XML format written in the RSS 101 may be directly extracted as the landmark name.

In this case, in the case where the landmark name is made to correspond to the geo 200 using a tag etc. to be written in the RSS 101, when the geo 200 is read out from the RSS 101, the portable NV device 1 may read out the landmark name corresponding to the geo 200. In the case where there is no landmark name to be extracted in the RSS 101, the portable NV device 1 does not have to read out a landmark name. In this case, the control unit 20 may display only the landmark LM (FIG. 9) corresponding to the novel POI on the map screen 70.

Furthermore, in the above-described embodiment, in case of detecting the geo tag such as <geo:lat> or <geo:long> in the character strings of the XML format of the RSS 101, the portable NV device 1 recognizes and extracts part sandwiched by <geo:lat> and </geo:lat>, and part sandwiched by <geo:long> and </geo:long> as the geo 200, to which the present invention is not restricted. A geo filled into the character strings of the XML format of the RSS 101 as part of text may be detected and extracted. The manner of filling the geo into the RSS 101 and the manner of extracting the geo are not restricted.

In this case, there may be employed a configuration in which, when obtaining the RSS 101 from the personal computer 12, the portable NV device 1 detects, for example, the Uniform Resource Locator (URL) as the link point information from the RSS 101, and, from the link point corresponding to the URL, obtains information (referred to as RSS related information, hereinafter) including text data corresponding to a text or a photograph data corresponding to a photograph, which are published on a home page based on the RSS 101, to extract the geo 200 from the RSS related information.

Furthermore, in the above-described embodiment, as the navigation device, the portable NV device 1 of the portable type (PND), which is described referring to FIG. 3 to FIG. 12, is employed, to which the present invention is not restricted. The present invention may be applied to a stationary vehicle NV device, a portable game device, a cellular phone, etc.

Furthermore, in the above-described embodiment, when the updating contents introduction data which introduces the latest updating contents of an arbitrary home page is sent from the outside, as an obtaining means for obtaining the updating contents introduction data, the USB connector 3 and control unit 20, which are described referring to FIG. 3 to FIG. 12, are employed, to which the present invention is not restricted. Other obtaining means such as a wired LAN adapter, a wireless LAN module, the Bluetooth (registered trademark of The Bluetooth SIG Inc.) may be employed.

Furthermore, in the above-described embodiment, as a position information generation means for generating position information according to the latitude and longitude information included in the updating contents introduction data, the control unit 20, which is described referring to FIG. 3 to FIG. 12, is employed, to which the present invention is not restricted. Other various position information generation means such as a position information generation circuit of hardware configuration which generates position information according to the latitude and longitude information included in the updating contents introduction data may be employed.

Furthermore, in the above-described embodiment, as a position registration means for registering position information in a predetermined storage means, the control unit 20, which is described referring to FIG. 3 to FIG. 12, is employed, to which the present invention is not restricted. Other various position registration means such as a position registration circuit of hardware configuration which registers position information in a predetermined storage means may be employed.

Furthermore, in the above-described embodiment, as a display means, the LCD 24 of the monitor 2, which is described referring to FIG. 3 to FIG. 12, is employed, to which the present invention is not restricted. A cathode-ray tube display and a plasma display may be employed.

Furthermore, in the above-described embodiment, as a position retrieval request means for, in the case where latitude and longitude information is not included in the updating contents introduction data, requesting an external device which has stored therein a position retrieval database to retrieve position information corresponding to a text included in the updating contents introduction data, the control unit 20, which is described referring to FIG. 3 to FIG. 12, is employed, to which the present invention is not restricted. Other various position retrieval request means such as a position retrieval request circuit of hardware configuration which, in the case where latitude and longitude information is not included in the updating contents introduction data, requests an external device which has stored therein a position retrieval database to retrieve position information corresponding to a text included in the updating contents introduction data may be employed.

Furthermore, in the above-described embodiment, the portable NV device 1 activates a processing program stored in the nonvolatile memory 21, and registers the novel POI from the RSS 101, to which the present invention is not restricted. The novel POI may be registered from the RSS 101 in accordance with a processing program installed from a recording medium, or a processing program downloaded from the Internet.

The navigation device and position registration method according to the embodiments of the present invention can be employed in an application of registering a novel POI in a portable NV device.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    circuitry configured to:
        control a display to display a register button for registration of receiving diary information from a server;
        obtain the diary information from the server based on the registration;
        determine whether or not the obtained diary information includes position information;
        extract a position related name from information of the obtained diary information when the obtained diary information does not include position information; and
        obtain position information based upon the extracted position related name.

2. The information processing device of claim 1, wherein the obtained diary information includes a thumbnail image.

3. The information processing device of claim 1, wherein the obtained diary information includes time period data.

4. The information processing device of claim 3, wherein the circuitry is configured to control the display to display the time period data associated with the position information.

5. The information processing device of claim 1, wherein the circuitry is configured to control the display to display an icon on a map according to the position information of the obtained diary information.

6. An information processing method comprising:
    controlling, via circuitry of an information processing device, a display to display a register button for registration of receiving diary information from a server;
    obtaining, via the circuitry, the diary information from the server based on the registration;
    determining, via the circuitry, whether or not the obtained diary information the diary includes position information;
    extracting, via the circuitry, a position related name from information of the obtained diary information when the obtained diary information does not include position information; and
    obtaining, via the circuitry, position information based upon the extracted position related name.

7. The information processing method of claim 6, wherein the obtained diary information includes a thumbnail image.

8. The information processing method of claim 6, wherein the obtained diary information includes time period data.

9. The information processing method of claim 8, further comprising:
    controlling, via the circuitry, the display to display the time period data associated with the position information.

10. The information processing method of claim 6, further comprising:
    controlling, via the circuitry, the display to display an icon on a map according to the position information of the obtained diary information.

11. A non-transitory computer readable medium storing instructions which when executed by a processor cause the process to perform a method, the method comprising:
    controlling a display to display a register button for registration of receiving diary information from a server;
    obtaining the diary information from the server based on the registration;
    determining whether or not the obtained diary information includes position information;
    extracting a position related name from information of the obtained diary information when the obtained diary information does not include position information; and
    obtaining position information based upon the extracted position related name.

12. The non-transitory medium of claim 11, wherein the obtained diary information includes a thumbnail image.

13. The non-transitory medium of claim 11, wherein the obtained diary information includes time period data.

14. The non-transitory medium of claim 13, the method further comprising:
    controlling the display to display the time period data associated with the position information.

15. The non-transitory medium of claim 11, the method further comprising:
    controlling the display to display an icon on a map according to the position information of the obtained diary information.

16. The information processing device of claim 1, wherein the obtained diary information includes metadata.

17. The information processing device of claim 16, wherein the metadata includes information related to a user.

18. The information processing method of claim 6, wherein the obtained diary information includes metadata.

19. The information processing method of claim 18, wherein the metadata includes information related to a user.

20. The non-transitory medium of claim 11, wherein the obtained diary information includes metadata.

21. The non-transitory medium of claim 20, wherein the metadata includes information related to a user.

* * * * *